United States Patent [19]

Larson et al.

[11] Patent Number: 4,550,355
[45] Date of Patent: Oct. 29, 1985

[54] REMOVABLE DISK CARTRIDGE WITH IMPROVED HUB LOCKING MECHANISM

[75] Inventors: Bert R. Larson, San Jose; Robert P. Wartenbergh, Woodside, both of Calif.

[73] Assignee: Dysan Corporation, Santa Clara, Calif.

[21] Appl. No.: 443,771

[22] Filed: Nov. 22, 1982

[51] Int. Cl.⁴ .............................................. G11B 23/02
[52] U.S. Cl. ...................................................... 360/133
[58] Field of Search ................. 360/133, 97; 369/77.2; 206/444

[56] References Cited

U.S. PATENT DOCUMENTS 4,394,700 7/1983 Edwards ............................ 360/133

Primary Examiner—A. J. Heinz
Attorney, Agent, or Firm—Townsend & Townsend

[57] ABSTRACT

A releasable hub locking mechanism for a disk hub assembly and a magnetic memory cartridge. A lever plate having an inner margin with a pair of hub flange pressure portions in surface contact with the lower surface of an inner hub flange arranged within the cartridge housing includes an outer margin with a lower release portion received in an aperture in the bottom portion of the cartridge housing. A longitudinally extending torsion spring has first and second ends secured against rotation by keeper bosses formed in the bottom casing portion and includes a central loop portion for applying a downward pressure to an inwardly extending tang located on the outer margin of the lever plate.

The torsion spring normally provides a rotational force to the lever plate to cause the hub to be locked in place by interference between the lower surface of the bottom casing portion and a lower hub flange located externally of the casing. When the cartridge is inserted into an associated disk drive, the disk drive release pin counteracts the force provided by the torsional spring to release the hub for rotation.

4 Claims, 7 Drawing Figures

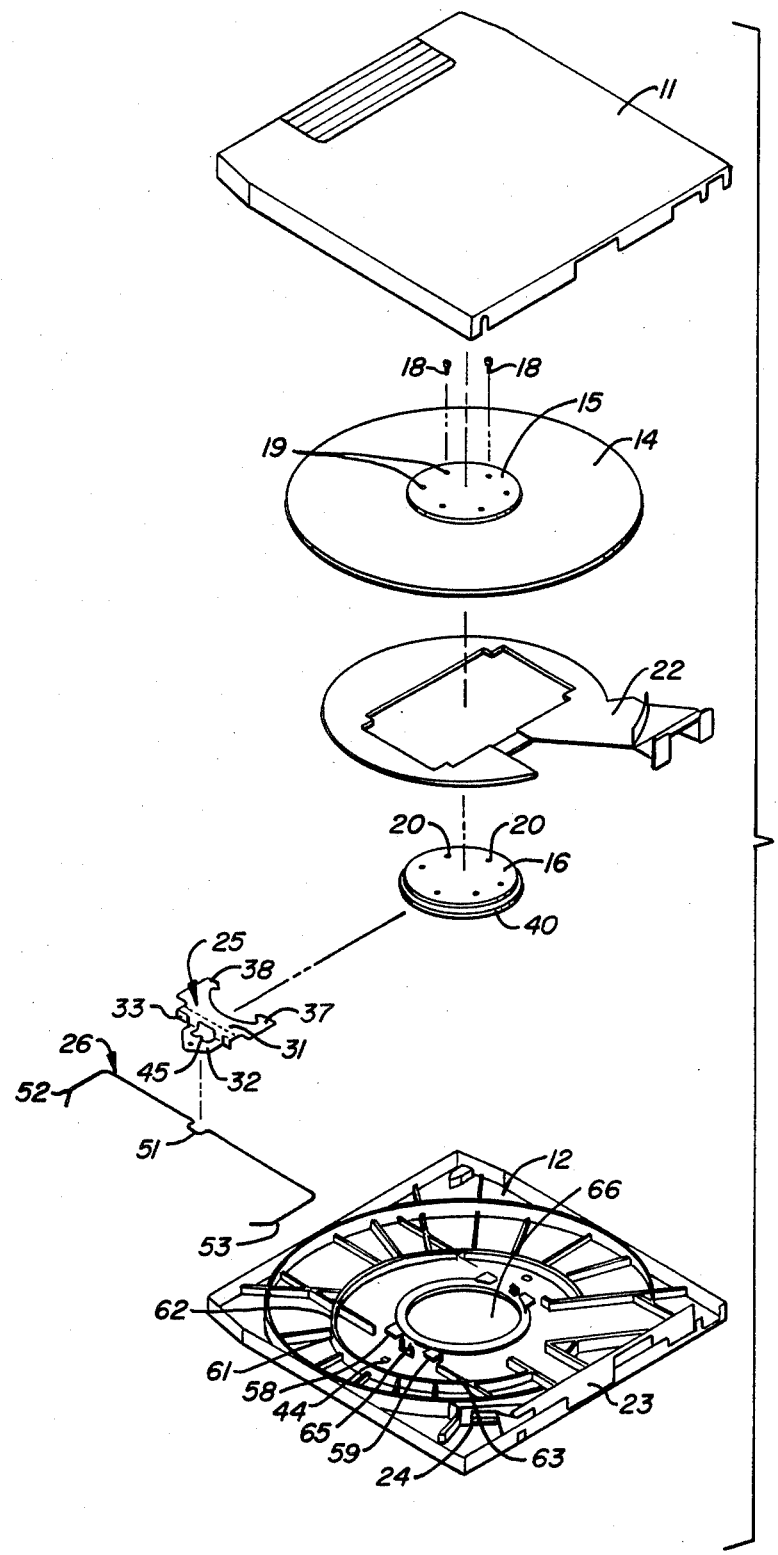
FIG._1.

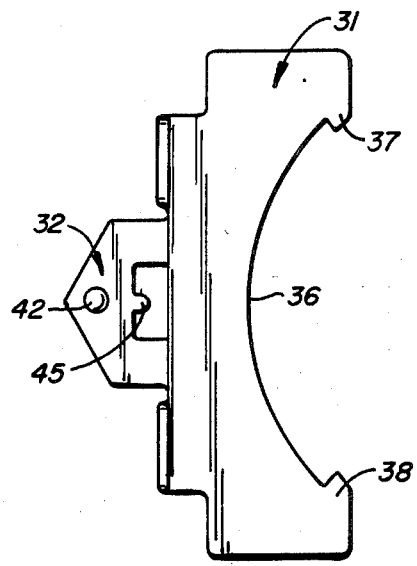
FIG._2.
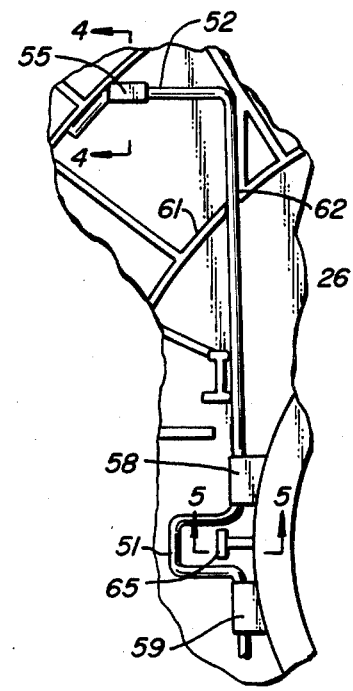
FIG._3.
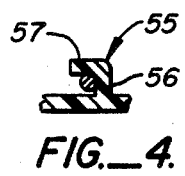
FIG._4.
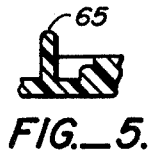
FIG._5.
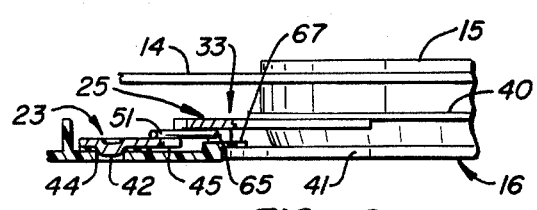
FIG._6.
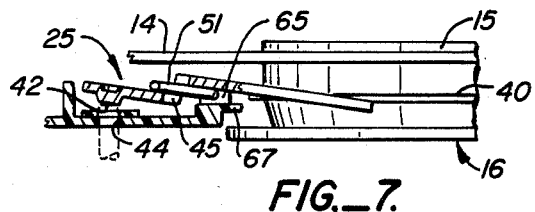
FIG._7.

REMOVABLE DISK CARTRIDGE WITH IMPROVED HUB LOCKING MECHANISM

BACKGROUND OF THE INVENTION

This invention relates to disk memory cartridges in general, and specifically to medium to small size disk memory cartridges adapted to be removably attached to an associated disk drive mechanism having a drive spindle.

Many current generation hard disk cartridges used in the data processing industry are designed to be removably attached to an associated disk drive unit. The removable disk cartridge typically includes a housing, a hard or rigid disk mounted within the housing, an externally accessible hub connected to the disk to be rotated by an externally located drive spindle, and an access door for enabling the Read/Write transducers located in the disk drive unit to be inserted into and removed from the interior of the disk cartridge. In medium to small disk cartridges, e.g., cartridges having a diameter of no more than eight inches, the access door is typically slidably arranged at the insertion end of the cartridge, and is spring biased to automatically move to a closed position in which the transducer access port is blocked by the door when the cartridge is not inserted into the disk drive unit.

In order to preserve the integrity of the delicate disk recording surfaces, a hub locking mechanism is typically incorporated into such disk cartridges which normally clamps the hub, and thus the disk, in a fixed position when the cartridge is not seated on the disk drive spindle. When locked in this position, the disk surfaces are rigidly maintained in non-contacting relationship with the internal components of the cartridge to preclude the possibility of the disk surface being scratched. The hub locking mechanism typically includes a release member engagable with a small pin or post carried by the disk drive unit. Whenever the cartridge is inserted into the disk drive unit in close proximity to the drive spindle, the pin progressively engages the release member to relieve the clamping force on the hub and thus permit the disk to be freely rotated within the cartridge housing by the drive spindle. Typical hub locking mechanisms employ two lever plates each having an inner edge margin providing an interference fit with an inner hub flange located in the interior of the cartridge housing, a pair of compression springs for spring loading the lever plate within the housing and a pair of fasteners such as bolts, for capturing the compression springs and securing the lever plate against rotation within the cartridge housing. Such an arrangement, while operable, requires assembly steps which are time consuming and somewhat delicate to perform which adds increased cost to the disk cartridge. In addition, several assembly components are required in order to provide convenient reference mounting posts for the compression springs, a pivot point for the lever plate, and abutment referencing surfaces, all of which complicates the design of known hub locking mechanisms.

SUMMARY OF THE INVENTION

The invention comprises an improved, highly simplified yet effective hub locking mechanism for a small rigid disk cartridge.

The invention comprises a releasable hub locking mechanism designed for use with a disk cartridge having a disk with a flanged hub housing, the housing having a base with an inner surface, the releasable hub locking mechanism including a lever plate having an inner margin with a pair of hub flange pressure portions for surface contact with the lower surface of the hub flange and an outer margin having a lower release portion received in an aperture in the inner base surface and a tang located adjacent the release portion. A torsion spring having a longitudinal axis has first and second ends secured against rotation by the base, and a central portion in contact with the tang, the spring being normally in torsional loading in order to apply a downward spring force on the tang. The central spring portion preferably comprises a loop which extends outwardly from the hub and over the tang, and the spring ends are preferably secured by means of a pair of keeper bosses formed in the inner surface of the base. The outer margin of the lever plate is located in a plane lying below the plane of the inner margin. The inner surface of the base includes an additional pair of keeper bosses flanking an upstanding pivot edge, which contacts the lower surface of the inner margin radially outwardly of the hub flange.

The invention is assembled by merely inserting the central portion of the torsion spring in the pair of keeper bosses flanking the pivot edge, inserting the hub through a central aperture formed in the base, arranging the lever plate with the hub flange pressure portions positioned under the hub flange and the lower release portion positioned over the base aperture and drawing the ends of the torsion springs down into the end keeper bosses so that the central spring portion contacts the lever plate tang.

Two such releasable hub locking mechanisms are provided for each disk cartridge at diametrically opposed locations on the inner surface of the base.

In order to provide additional stability to the torsion spring, the inner surface of the housing is provided with an upstanding wall having a pair of slots located between the outer lateral limit of the lever plate and the spring end keeper bosses.

For a fuller understanding of the nature and advantages of the invention, reference should be had to the ensuing detailed description taken in conjunction with the accompanying drawings.

BRIEF DESCRIPTION OF THE DRAWINGS

FIG. 1 is an exploded perspective view illustrating the invention;

FIG. 2 is an enlarged bottom plan view of the lever plate;

FIG. 3 is an enlarged partial top plan view of the housing base inner surface;

FIG. 4 is a sectional view taken along lines 4—4 of FIG. 3;

FIG. 5 is a sectional view taken along lines 5—5 of FIG. 3;

FIG. 6 is a partial sectional view illustrating the invention with the hub in the locked position;

FIG. 7 is a view similar to FIG. 6 showing the hub in the released position.

DESCRIPTION OF THE PREFERRED EMBODIMENTS

Turning now to the drawings, FIG. 1 shows an exploded perspective view of a disk cartridge assembly incorporating the invention. As seen in this FIG., a disk cartridge housing having a mating top casing 11 and a bottom casing 12 encloses a rigid disk assembly comprising a recording disk 14, a disc clamp 15 and a lower flange 16. Disk 14 is secured between disc clamp 15 and hub 16 by a plurality of fastener bolts 18 received through bores 19 in disc clamp 15 and threaded into tapped bores 20 in lower hub 16. The cartridge assembly further includes an air flow plate 22, a slidable door 23 and a door retraction mechanism 24.

The disk assembly is retained within the cartridge housing by means of a releasable hub locking mechanism which includes a pair of lever plates 25 (only one of which is shown), a torsion spring 26 for each lever plate 25, and cooperating elements formed in the inner base surface of bottom casing 12.

As best seen in FIGS. 1 and 2, each lever plate 25 includes first and second portions 31, 32 each generally planar in configuration, with the outer margin portion 32 located in a plane below inner margin portion 31, the two margin portions being joined by a vertical wall portion 33. Inner portion 31 has a circular segmental inner periphery 36 provided at each end with a hub flange pressure portion 37, 38 of sufficient inward extent to reach inwardly of an upper hub flange 40 formed about hub 16. The outer margin portion of each lever plate 25 includes a downwardly extending rounded dimple 42 engagable with a small off center aperture 44 formed in the base wall of the bottom casing 12, and a small tang 45 extending toward the hub flange 40.

Each torsion spring 26 has a central rectangular loop portion 51 which presses against the top of the tang 45 and first and second end portions 52, 53 each secured in an upstanding keeper boss, each molded into the base of lower casing 12. As seen in FIG. 4, the keeper boss 55 for spring end 52 comprises a central upstanding support portion which angles over at the top to form a keeper portion 57. The keeper boss for the remaining end 53 of torsion spring 51 is similarly formed.

An additional pair of keeper bosses 58, 59 is also formed in the base of bottom casing 12 in a location flanking the position of the loop portion 51 of spring 26 when installed, which provides additional stability for torsion spring 26. In addition, a circular support rib 61 formed in the base of bottom casing 12 is provided with a pair of slots 62, 63 in which the outboard central portions of spring 26 are loosely received to provide still further positional stability for the spring 26.

An upstanding pivot support 65 is formed in the base of lower casing 12 on which the lower surface of inner lever plate margin 31 rockably rests.

The device is assembled in the following manner. Torsion spring 26 is maneuvered downwardly onto the base of bottom casing 12 and the central portion is inserted under the keeper bosses 58, 59 with the outboard central portions received in slots 62, 63. The spring is rotated about its axis so that the central loop portion 51 points upwardly. Hub 16 is then inserted from below bottom casing 12 through large central aperture 66 until flange 40 is positioned above the inner surface of bottom casing 12. Lever plate 25 is then maneuvered so that the hub flange pressure portions 37, 38 are received under flange 40 and dimple 42 is received in aperture 44, after which spring 26 is rotated downwardly until the loop portion 51 presses down on the upper surface of tang 45 and each end 52, 53 is snapped into its keeper boss. After both hub locking mechanisms have been installed, the remainder of the assembly is completed by placing air flow plate 22 over hub 16, securing disk 14 to hub 16 by means of disc clamp 15 and bolts 18, installing the sliding door 23 and door operating mechanism 24 and attaching top casing 12.

In use, whenever the disk cartridge is not inserted into the associated disk drive unit, the disk/hub assembly is locked in place by means of the hub locking mechanism. With reference to FIG. 6, the lever 25 is biased by torsion spring 26 in such a direction as to provide a lifting force to the hub 16 (clockwise direction) for the locking mechanism shown in FIG. 6 so that the outer surface of the lower hub flange 40 physically engages the flanged wall surface 67 of the central aperture 66.

When the disk cartridge is installed in the associated disk drive unit, a release post carried by the disk drive unit and shown in phantom in FIG. 7 passes upwardly through aperture 44 and contacts dimple 42 to pivot lever 25 on pivot edge 65, thereby disengaging the hub flange pressure portions 37, 38 from the lower surface of the hub flange 40, thereby unlocking the hub.

As will now be apparent, hard disk cartridges provided with a pair of releasable hub locking mechanisms fabricated according to the teaching of the invention provide the desired releasable hub locking function without the necessity for complicated structural components. In addition, each hub locking mechanism can be easily assembled by those having relatively little skill, and, due to the simplicity of the design, the mechanism is very durable and reliable.

While the above provides a full and complete disclosure of the preferred embodiment of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. A disk cartridge assembly comprising; a housing having top and bottom portions with an inner surface for forming an enclosure, said bottom portion having a central aperture for receiving a disk hub and an offset aperture for permitting access to a hub locking mechanism, said inner surface of said bottom portion having an upstanding pivot edge located between said central and offset apertures;

a rigid disk assembly including a recording disk secured to an upper armature, a lower hub having an inner flange normally located within said enclosure and an outer flange normally located outside said enclosure, and means for securing together said disk, and armature, and said hub;

a releasable hub locking mechanism including a lever plate having an inner margin with a pair of hub flange pressure portions for surface contact with a lower surface of said inner hub flange, an outer margin having a lower release portion adapted to be engaged by a lock releasing element received in said offset aperture in said housing bottom portion surface, and an inwardly extending tang located adjacent said release portion; said inner margin having a lower surface with a portion thereof in surface contact with said pivot edge at a position between said tang and said inner margin to provide a pivot point about which the lever plate may rotate to cause the hub flange pressure portions to forcibly engage the lower surface of the inner hub flange; and a longitudinally extending torsion spring located within said enclosure and having first and second ends secured against rotation by a pair of keeper bosses located on said inner surface of said bottom portion at positions flanking said hub flange pressure portions of said lever plate and a central portion in contact with said tang, said spring being normally in tosional compression for applying a downward spring force on said tang to cause said hub flange pressure portions to contact the lower surface of said inner hub flange which inturn biases said outer flange into engagement with the bottom portion of the housing.

2. The combination of claim 1 wherein said central spring portion comprises a loop extending outwardly from said longitudinal axis of said spring and over said tang.

3. The combination of claim 1 wherein said outer margin is located in a plane lying below the plane of said inner margin.

4. The combination of claim 1 wherein said inner surface of said bottom portion includes an additional pair of keeper bosses at positions flanking said pivot edge for retaining longitudinal portions of said torsion spring.

* * * * *